United States Patent
Sabini et al.

(10) Patent No.: US 7,717,683 B2
(45) Date of Patent: May 18, 2010

(54) SELF CONTAINED PUMP ELECTRICAL EQUIPMENT POWER SUPPLY

(75) Inventors: Eugene P. Sabini, Skaneateles, NY (US); Jerome A. Lorenc, Seneca Falls, NY (US); Oakley Henyan, Auburn, NY (US); Kenneth L. Hauenstein, Seneca Falls, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 477 days.

(21) Appl. No.: 10/142,181

(22) Filed: May 9, 2002

(65) Prior Publication Data

US 2003/0210993 A1 Nov. 13, 2003

(51) Int. Cl.
*F04B 51/00* (2006.01)
*F04B 17/00* (2006.01)

(52) U.S. Cl. .......................... 417/411; 417/24; 417/63; 417/313; 417/374; 417/423.7; 310/112; 310/113; 310/114

(58) Field of Classification Search ................ 417/411, 417/423.1, 423.7, 63, 313, 374, 199.1, 24, 417/410.3, 423.15; 310/112, 113, 114, 104, 310/115, 118, 121, 122
See application file for complete search history.

(56) References Cited

U.S. PATENT DOCUMENTS

| | | | | |
|---|---|---|---|---|
| 1,672,191 A | * | 6/1928 | Anderson et al. | 123/195 A |
| 2,364,013 A | * | 11/1944 | Waseige | 290/1 A |
| 3,751,192 A | * | 8/1973 | Boyd | 417/411 |
| 4,095,922 A | * | 6/1978 | Farr | 417/313 |
| 4,203,710 A | * | 5/1980 | Farr | 417/53 |
| 4,429,242 A | * | 1/1984 | Layh | 310/71 |
| 4,467,657 A | * | 8/1984 | Olsson | 73/861 |
| 4,469,966 A | | 9/1984 | Iwaki et al. | 310/62 |
| 4,512,726 A | * | 4/1985 | Strimling | 417/412 |
| RE31,947 E | * | 7/1985 | Farr | 417/313 |
| 4,971,522 A | * | 11/1990 | Butlin | 417/18 |
| 5,059,097 A | * | 10/1991 | Okazaki et al. | 417/222.2 |
| 5,087,824 A | * | 2/1992 | Nelson | 290/1 A |
| 5,242,278 A | * | 9/1993 | Vanderslice et al. | 417/364 |
| 5,362,207 A | * | 11/1994 | Martin et al. | 417/243 |
| 5,604,412 A | * | 2/1997 | Okada et al. | 318/254 |
| 5,625,276 A | | 4/1997 | Scott et al. | 322/24 |
| 5,709,103 A | * | 1/1998 | Williams | 62/402 |
| 5,959,385 A | * | 9/1999 | Kato et al. | 310/112 |
| 6,093,986 A | * | 7/2000 | Windhorn | 310/68 B |
| 6,099,265 A | * | 8/2000 | Rowe et al. | 417/313 |
| 6,132,186 A | * | 10/2000 | Cooper et al. | 417/423.7 |
| 6,315,524 B1 | * | 11/2001 | Muhs et al. | 417/199.2 |
| 6,534,958 B1 | * | 3/2003 | Graber et al. | 322/11 |
| 2002/0089248 A1 | * | 7/2002 | Gozdawa | 310/112 |
| 2003/0011259 A1 | * | 1/2003 | Johnsen | 310/112 |

* cited by examiner

*Primary Examiner*—Devon C Kramer
*Assistant Examiner*—Leonard J Weinstein

(57) ABSTRACT

An electrical power supply for powering electrical pump instrumentation and process control equipment associated with a pump having a rotating member. The power supply includes an electrical current generator driven by the rotating member of the pump, and a voltage regulator for regulating the output of the generator.

20 Claims, 5 Drawing Sheets

SELF CONTAINED PUMP ELECTRICAL EQUIPMENT POWER SUPPLY

FIELD OF THE INVENTION

This invention relates to systems and methods for supplying electrical power to equipment located near or attached to a pump, and more particularly, to a pump driven electrical current generator that powers electrical pump instrumentation and process control equipment located near or attached to the pump.

BACKGROUND OF THE INVENTION

The prior art utilizes essentially three basic techniques for supplying electrical power to equipment, such as pressure transmitters, temperature transmitters, vibration sensors, and the like, located near or attached to a pump. The first technique involves hard wiring directly to each piece of electrical equipment. The second technique involves providing the electrical equipment with internal batteries or external batteries. The third technique involves providing the electrical equipment with a combination of a rechargeable battery and solar panel. The solar panel powers the equipment during daylight hours and charges the battery for use during night hours.

Hard wiring electrical power directly to the electrical equipment has the highest installation cost of the three methods mentioned above. In most facilities conduit and wiring must be purchased and installed from the power panel to where the pump is located. Battery powered electrical equipment has a lower installation cost but a higher maintenance cost in terms of checking battery condition and performing battery replacement. Battery powered electrical equipment with rechargeable batteries charged via solar panels reduces the need to check battery condition and battery replacement, but requires adequate light hours to recharge the batteries.

Accordingly, a technique for supplying electrical power to equipment located near or attached to a pump is needed that avoids the disadvantages of the prior art.

SUMMARY

An electrical power supply for powering electrical pump instrumentation and process control equipment associated with a pump having a rotating member. The power supply comprises an electrical current generator driven by the rotating member of the pump.

A pump comprising a rotating member, an electrical current generator driven by the rotating member, for powering electrical pump instrumentation and process control equipment associated with the pump.

A pump system comprising a pump having a rotating member, electrical pump monitor and control equipment, an electrical current generator driven by the rotating member of the pump, the current generator for powering the electrical pump instrumentation and process control equipment.

BRIEF DESCRIPTION OF THE DRAWINGS

In the drawings, the like reference characters have been used to identify like elements.

It should be understood that the drawings are solely for the purpose of illustrating the concepts of the invention and are not intended as a level of the limits of the invention.

DETAILED DESCRIPTION

Figure 1:
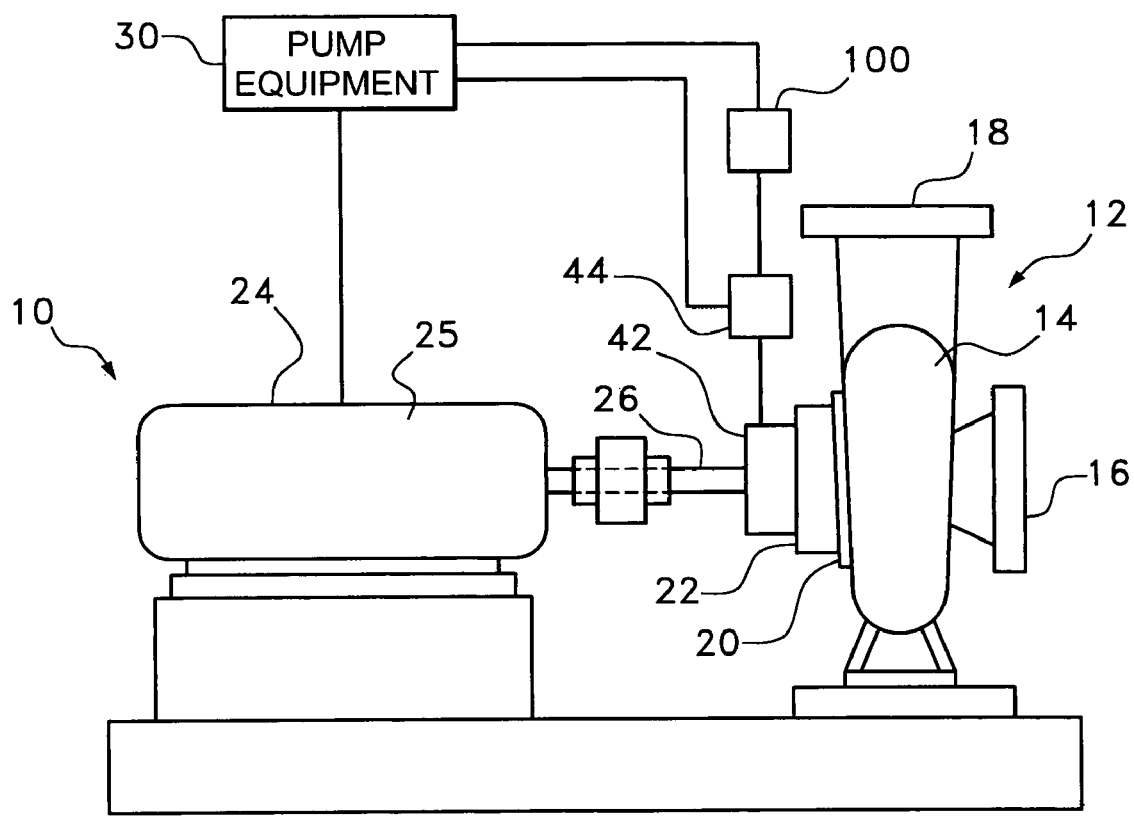
FIG. 1 is a elevational view of an exemplary pump system that utilizes an electrical power supply made according to an embodiment of the present invention.

FIG. 1 shows a pump system 10 generally comprising a pump 12 and electrical pump instrumentation and process control equipment 30 which may be at (e.g., mechanically attached to the pump) or near the pump 12. A similar pump system is described in detail in U.S. Pat. No. 6,464,464, entitled APPARATUS AND METHOD FOR CONTROLLING A PUMP SYSTEM, which is incorporated herein by reference in its entirety.

The pump 12 may be of any desired type, for example, a centrifugal or positive displacement pump. The pump 12 has a stationary casing 14 with a pump suction inlet nozzle 16, a discharge nozzle 18 and a bearing frame 20 with thrust end cover 22. An impeller (not visible), disposed within the casing 14, is coupled to a drive motor 24 by an impeller drive shaft 26 supported in the bearing frame 20.

In accordance with the principles of the present invention, the pump system 10 further includes a self contained electrical power supply for powering the pump instrumentation and process control equipment 30 at or near the pump 12. As seen in FIG. 1, the power supply generally comprises an alternating current (AC) generator 42 driven by the pump 12 and a voltage regulator 44 for processing the voltage output of the AC generator 42. The voltage regulator 44 has DC voltage outputs for the instrumentation and process control equipment 30. The DC voltage outputs of the voltage regulator may include but are not limited to +/−5.0 VDC, 12 VDC, and 24 VDC.

Figure 2A:
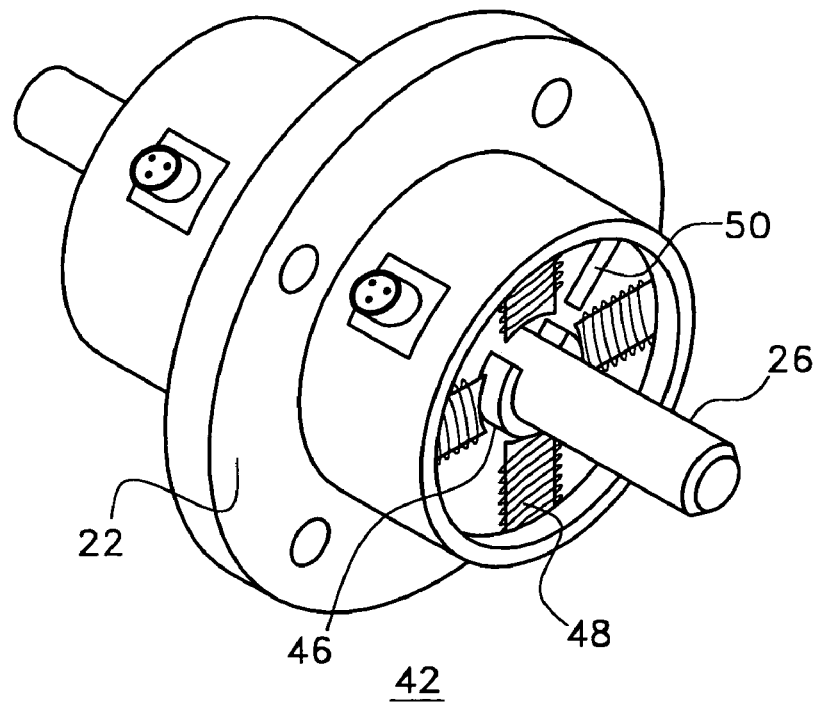
FIG. 2A is perspective view of an AC generator used in the power supply of the present invention.
Figure 2B:
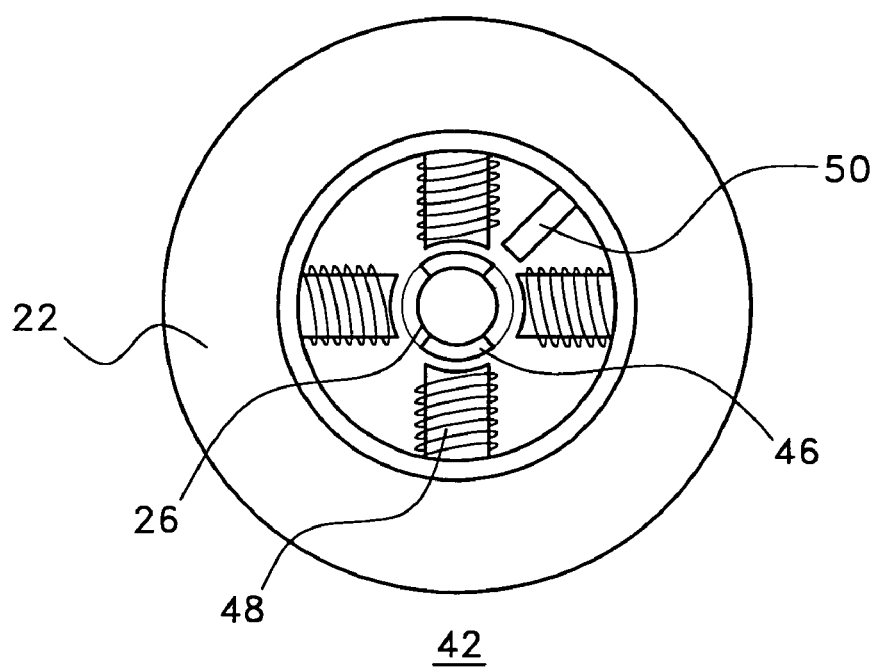
FIG. 2B is an elevational view of the AC generator.

As shown in FIGS. 2A and 2B, the AC generator 42 of the power supply includes a rotating component 46 (rotor) and a stationary component 48 (stator). In one embodiment, the stator 48 comprises an annular arrangement of electrically conductive wire coils or windings attached to the thrust end cover 22 of the bearing frame 20, and the rotor 46 comprises a ring-shaped permanent magnet arrangement mounted to a section of the impeller drive shaft 26 that extends through the thrust end cover 22. The rotor 46 is positioned on this section of the impeller drive shaft 26 such that it spins inside the stator 48 and induces a voltage in the stator windings that alternately reverses from positive to negative polarity, thereby producing a corresponding change in the direction of current flow, i.e., an alternating current. The stator 48 can also be stationary mounted on the housing 25 of the drive motor 24.

Optionally included in the AC generator 42 is a sensor 50 that senses impeller drive shaft rotation to provide a TTL output signal that is useful for determining pump operating parameters such as pump speed or as a trigger for vibration analysis via for example, Time Synchronous Averaging. The sensor 50 is typically embedded in the stator 48 such that it can sense the magnets of the rotor 46 as they pass by. In one embodiment of the invention, the sensor 50 may comprise a Hall latching sensor. One of ordinary skill in the art will of course appreciate that other types of Hall or like sensors may be utilized.

Figure 3:
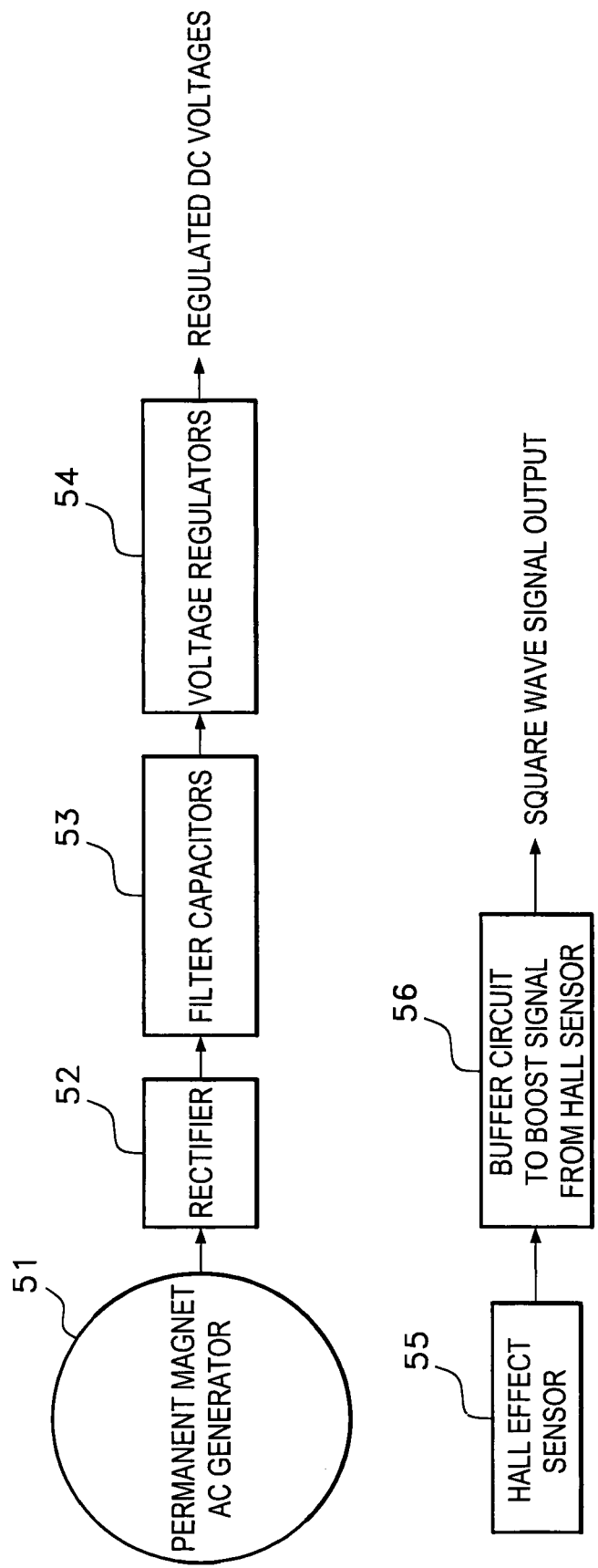
FIG. 3 is a block diagram of the electrical power supply according to the present invention.

FIG. 3 is a block diagram of the power supply of the invention. Block 51 represents the permanent magnet of the AC generator, block 52 represents a rectifier circuit that converts the AC voltage produced by the generator to an unregulated DC voltage, block 53 represents filter capacitors that smooth the unregulated DC voltage, and block 54 represents voltage regulators that regulate the DC voltages. Block 55 represents the Hall effect sensor that senses impeller drive shaft rotation, block 56 represents a buffer circuit that boosts the signal produced by the sensor to provide a square wave signal output.

Figure 4:
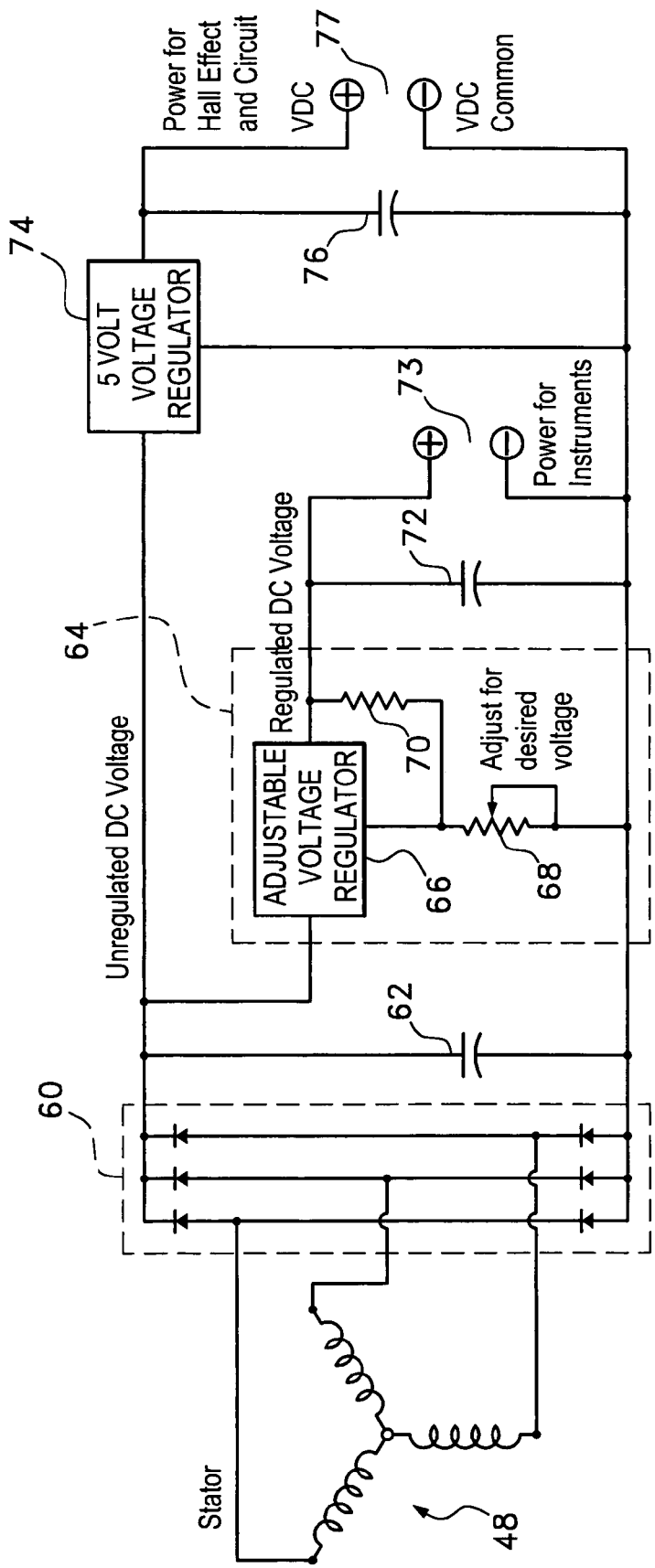
FIG. 4 is a circuit diagram of a voltage regulator of the electrical power supply according to an embodiment of the present invention.

FIG. 4 shows a circuit diagram of the voltage regulator 44 according to an illustrative embodiment of the present invention. A bridge rectifier circuit 60 converts the AC voltage induced in the windings of the stator 48 by the rotor magnets to an unregulated DC voltage, which is smoothened by a filter capacitor 62. An adjustable voltage regulator circuit 64 having an adjustable voltage regulator 66 regulates the unregulated DC voltage to a desired magnitude via a variable resistor 68 that allows the desired DC voltage at equipment output 73 to be selectively adjusted and a resistor 70 that provides the adjustable voltage regulator with feedback pertaining to its output. A second filter capacitor 72 smoothes the regulated DC voltage for output to the instrumentation and process control equipment. A fixed voltage regulator 74 whose output is smoothened via a third filter capacitor 76, regulates the unregulated DC voltage to a predetermined DC voltage at output 77, e.g., 5 volts DC, to power the Hall sensor 50 and a buffer circuit (FIG. 5) which boosts the signal from the sensor 50.

Figure 5:
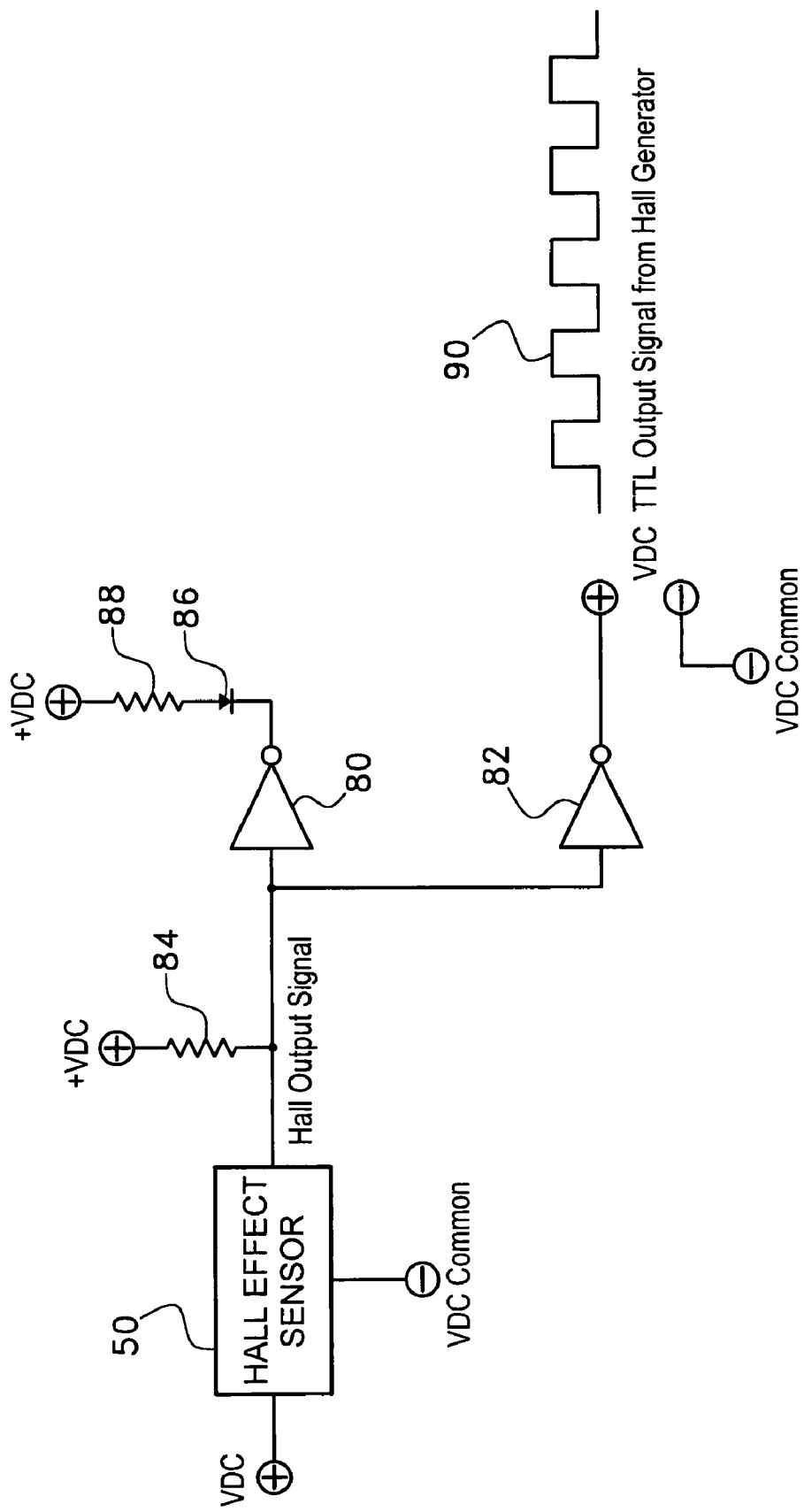
FIG. 5 is a circuit diagram of a sensor buffer of the electrical power supply according to an embodiment of the present invention.

FIG. 5 shows a circuit diagram of a sensor buffer according to an illustrative embodiment of the present invention, wherein the sensor 50 comprises a latching type Hall sensor. The regulated DC voltage produced at the sensor output 77 of the voltage regulator 74 (FIG. 4) is fed to the Hall sensor 50. The regulated DC voltage is also fed to first and second TTL line drivers 80, 82 via a first resistor 84, and an LED 86 via a second resistor 88. The first TTL line driver 80 boosts the Hall output signal applied to the LED 86, which indicates Hall operation. The second TTL line driver 82 boosts the Hall output signal to provide a TTL data signal 90. The number of TTL cycles per revolution of the impeller shaft 26 (FIG. 1) is dependent upon the number of poles used in the rotor 46. For example, a four pole rotor will produce a TTL data signal having 2 TTL cycles per revolution of the impeller drive shaft 26. It should be apparent to those skilled in the art that other configurations of the generator's rotor 46 can produce more or less TTL cycles per revolution of the impeller drive shaft 26.

The voltage regulator and sensor buffer circuits may be formed on a conventional printed-circuit PC board using conventional electronic components. The PC board 95 may be mounted either integral with the AC generator or as a stand alone unit.

The power supply of the present invention may also include a rechargeable battery backup 100 (FIG. 1) for powering the pump equipment to obtain pump system information when the pump of the system is not operating. The rechargeable batteries 100 are recharged by the AC generator when the pump is in operation.

The voltage regulators of block 54 (FIG. 3) are not limited to the linear voltage regulator design described above. For example, a switching regulator design may be used in place of the linear voltage regulator design to produce DC voltages.

As should now be apparent to those skilled in the art, the power supply of the present invention is an inexpensive addition to a conventional pump system, that provides local electrical power to power electrical equipment at or near the pump. The invention eliminates the need to hard wire electrical power directly to the instrumentation and process control equipment of the pump system from an external power grid. Standard batteries associated with conventional power supplies, whose condition must be checked and replaced when low, are not used in the present invention. If power is required to obtain pump system information when the pump of the system is not operating, the rechargeable battery backup may be used. The dependency on adequate solar light to fully recharge the batteries is no longer needed as the rechargeable batteries are recharged when the pump is in operation.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A pump system (10) comprising:
    a pump (12) having a stationary casing (14) with a frame (20);
    a drive motor (24) with an impeller drive shaft (26) directly connected to a rotating member of the pump and driving the pump (12) to pump a fluid or other medium with the rotating member;
    pump monitoring equipment (30) for monitoring the pump (12) and/or the drive motor (24); and
    an alternating current (AC) generator (42) or other suitable electrical generator arranged in relation to the drive motor (24) and the pump (12), having a rotary component (46) and a stationary component (48), the stationary component (48) being attached to the frame (20) and having an annular arrangement of electrically conductive wire coils or windings, the rotary component (46) being rotatably mounted directly on a section of the impeller drive shaft (26) for rotating about the axis of the impeller drive shaft (26) in relation to the stationary component (48) that does not rotate along with the impeller drive shaft (26), the alternating current (AC) generator (42) or other suitable electrical generator being configured for providing power to the pump monitoring equipment (30).

2. The pump system (10) according to claim 1, wherein the pump monitoring equipment (30) includes one or more pressure or temperature transmitters, one or more vibration sensors or other suitable monitoring equipment.

3. The pump system (10) according to claim 1, wherein the pump system (10) further comprises a voltage regulator (44) arranged between the alternating current (AC) generator (42) and the monitoring equipment (30) for processing a voltage output of the alternating current (AC) generator (42) and providing a direct current (DC) voltage output to the pump monitoring equipment (30).

4. The pump system (10) according to claim 1, wherein the rotary component (46) spins inside the stationary component (48) and induces a voltage inside stator windings of the stationary component (48) for providing an alternating current.

5. The pump system (10) according to claim 1, wherein the alternating current (AC) generator (42) comprises a sensor (50) that senses the rotation of the impeller drive shaft (26) and provides a sensor output signal containing information about one or more pump operating parameters, including pump speed.

6. A pump system (10) according to claim 1, wherein the pump system further comprises: a sensor (50) that senses the rotation of the impeller drive shaft (26) and provides a sensor output signal containing information used to determine one or more pump operating parameters, which may include pump speed, or the sensor output signal provides a trigger for vibration analysis, including time synchronous averaging.

7. The pump system (10) according to claim 1, wherein the alternating current (AC) generator (42) comprises a rectifier (52) that converts AC voltage into an unregulated DC voltage.

8. The pump system (10) according to claim 7, wherein the alternating current (AC) generator (42) comprises a filter, including a capacitor, that smoothes the unregulated DC voltage.

9. The pump system (10) according to claim 8, wherein the alternating current (AC) generator (42) comprises one or more voltage regulators (54) that responds to the unregulated DC voltage for providing regulated DC voltages.

10. The pump system (10) according to claim 1, wherein the alternating current (AC) generator (42) comprises a Hall effect sensor that senses the impeller drive rotation.

11. The pump system (10) according to claim 10, wherein the alternating current (AC) generator (42) comprises a buffer circuit (56) to boost the signal from the Hall effect sensor (55) and provides a square wave output signal.

12. The pump system (10) according to claim 1, wherein the frame (20) is a bearing frame.

13. The pump system (10), comprising:
a pump (12) having a stationary casing (14) with a frame (20);
a drive motor (24) with an impeller drive shaft (26) directly connected to a rotating member of the pump and driving the pump (12) to pump a fluid or other medium with the rotating member;
pump monitoring equipment (30) for monitoring the pump (12) and/or the drive motor (24); and
an alternating current (AC) generator (42) or other suitable electrical generator arranged in relation to the drive motor (24) and the pump (12), having a rotary component (46) and a stationary component (48) that is attached to the frame (20), the rotary component (46) being rotatably mounted directly on a section of the impeller drive shaft (26) for rotating about the axis of the impeller drive shaft (26) in relation to the stationary component (48) that does not rotate along with the impeller drive shaft (26), the rotary component (46) spinning inside the stationary component (48) and inducing a voltage inside stator windings of the stationary component (48) for providing an alternating current, the alternating current (AC) generator (42) or other suitable electrical generator being configured for providing power to the pump monitoring equipment (30).

14. The pump system (10) according to claim 13, wherein the rotary component (46) comprises a ring-shaped permanent magnet arrangement mounted on the section of the impeller drive shaft (26).

15. The pump system (10) according to claim 5, wherein the sensor (50) is a Hall latching sensor or other suitable Hall sensor.

16. The pump system (10) according to claim 13, wherein the pump monitoring equipment (30) includes one or more pressure or temperature transmitters, one or more vibration sensors or other suitable monitoring equipment.

17. The pump system (10) according to claim 13, wherein the pump system (10) further comprises a voltage regulator (44) arranged between the alternating current (AC) generator (42) and the monitoring equipment (30) for processing a voltage output of the alternating current (AC) generator (42) and providing a direct current (DC) voltage output to the pump monitoring equipment (30).

18. The pump system (10) according to claim 13, wherein the alternating current (AC) generator (42) comprises the stationary component (48) having an annular arrangement of electrically conductive wire coils or windings.

19. The pump system (10), comprising:
a pump (12) having a stationary casing (14) with a frame (20);
a drive motor (24) with an impeller drive shaft (26) directly connected to a rotating member of the pump and driving the pump (12) to pump a fluid or other medium with the rotating member;
pump monitoring equipment (30) for monitoring the pump (12) and/or the drive motor (24); and
an alternating current (AC) generator (42) or other suitable electrical generator arranged in relation to the drive motor (24) and the pump (12), having a rotary component (46) and a stationary component (48) that is attached to the frame (20), the rotary component (46) being rotatably mounted directly on a section of the impeller drive shaft (26) for rotating about the axis of the impeller drive shaft (26) in relation to the stationary component (48) that does not rotate along with the impeller drive shaft (26), the alternating current (AC) generator (42) or other suitable electrical generator being configured for providing power to the pump monitoring equipment (30), the alternating current (AC) generator (42) comprising a sensor (50) that senses the rotation of the impeller drive shaft (26) and provides a sensor output signal containing information about one or more pump operating parameters, including pump speed, the sensor (50) being embedded in the stationary component (48) of the alternating current (AC) generator (42) for sensing magnets of the rotary component (46) as they rotate inside the stationary component (48).

20. The pump system (10) according to claim 19, wherein the rotary component (46) spins inside the stationary component (48) and induces a voltage inside stator windings of the stationary component (48) for providing an alternating current.

* * * * *